US005122207A

United States Patent [19]

Alabi

[11] Patent Number: 5,122,207
[45] Date of Patent: Jun. 16, 1992

[54] HYPO-EUTECTIC ALUMINUM-SILICON-COPPER ALLOY HAVING BISMUTH ADDITIONS

[75] Inventor: Muftau M. Alabi, Amherst, N.Y.

[73] Assignee: General Motors Corporation, Detroit, Mich.

[21] Appl. No.: 733,540

[22] Filed: Jul. 22, 1991

[51] Int. Cl.$^5$ .................. C22C 21/00; C22C 21/02
[52] U.S. Cl. ..................... 148/438; 148/415; 148/416; 420/528; 420/529; 420/531; 420/537
[58] Field of Search .............. 148/3, 158, 159, 405, 148/415, 416, 438; 420/529, 537, 531

[56] References Cited

U.S. PATENT DOCUMENTS 4,170,469  10/1979  Mori ............................ 428/652

FOREIGN PATENT DOCUMENTS 2124748  10/1972  France .
0145741   6/1988  Japan .

OTHER PUBLICATIONS

Aluminum alloys A356 and A357 Elemental Composition taken from "Aluminum Casting Technology" published by the American Foundrymen's Society, Inc., Des Plaines, Illinois.

Primary Examiner—R. Dean
Assistant Examiner—Sikyin Ip
Attorney, Agent, or Firm—George A. Grove; Domenica N. S. Hartman

[57] ABSTRACT

An improved aluminum-silicon-copper alloy having a relatively high level of bismuth is provided which is particularly wear-resistant and sufficiently self-lubricating so as to be suitable for use in a wearing component even when poorly lubricated. The relatively high bismuth level within the alloy cooperates with the other elemental additions so as to provide a sufficiently low friction bearing surface (or self-lubricity), which significantly enhances the wear resistant properties of the alloy. In particular, the preferred aluminum alloy is suited for use in a socket plate which receives high strength steel bearing members within a compressor unit of an automobile air conditioning system. The improved aluminum alloy should minimize wear and alleviate galling of the socket plate during use. In addition, the improved aluminum alloy should have sufficient strength and ductility so as to permit swaging of the socket plate formed from the alloy around a balled end of the high strength steel bearing member.

8 Claims, 1 Drawing Sheet

HYPO-EUTECTIC ALUMINUM-SILICON-COPPER ALLOY HAVING BISMUTH ADDITIONS

The present invention is related to copending patent application, U.S. Ser. No. 07/733,539, entitled "Hypo-Eutectic Aluminum-Silicon Alloy Having Tin and Bismuth Additions", filed Jul. 22, 1991, and assigned to the same assignee of the present application.

The present invention generally relates to a hypo-eutectic aluminum-silicon-copper alloy which is suitable for use in a wearing environment. More particularly, this invention relates to such an aluminum-silicon-copper alloy having a relatively substantial addition of bismuth; wherein the inventive aluminum-silicon-copper alloy is characterized by sufficient lubricity and strength to be extremely useful for wear resistant applications, yet also suitably ductile to readily permit swaging and/or other forming operations of the alloy.

BACKGROUND OF THE INVENTION

Air conditioning systems are routinely employed within automobiles and other vehicles for creating comfortable conditions within the passenger compartment for the vehicle occupants. At outside temperatures above about 70° F., it is difficult to maintain a comfortable passenger compartment temperature without first cooling the air that is being blown into the passenger compartment.

Typically, cooling of the air is accomplished by first compressing an appropriate refrigerant, such as the commonly used fluorocarbons (known as freon) or other alternative refrigerants. Within an automobile, the engine-driven compressor compresses the vaporized refrigerant, thereby significantly raising the temperature of the refrigerant. The refrigerant then flows into a condenser where it is cooled and returned to its liquid state; thus, the heat added to the refrigerant in the compressor is transferred out of the system. The cooled liquid refrigerant is then sprayed through an expansion valve into an evaporator where it is again vaporized. The heat of vaporization required for vaporizing the refrigerant is drawn from the incoming outside air, which is blown around the evaporator. Any excess humidity contained within the incoming air is removed as condensation on the evaporator, thereby also drying the incoming air. The cooled, dry air then enters the passenger compartment of the vehicle.

The materials and components within the air conditioning system must be capable of withstanding extremely demanding conditions, particularly, the materials used to form the components within the engine driven compressor. The compressor contains many mating components which continuously wear against each other during operation of the air conditioning system, while also being subject to significant pressures due to the compressed refrigerant. Appropriate lubricants are provided throughout the compressor at these bearing surfaces, so as to prevent excessive wear and galling between the mating materials. Typically in the past, a lubricant which is soluble in the refrigerant has been added directly in with the refrigerant when charging the compressor with the pressurized refrigerant prior to use. Since the conventional lubricants have been soluble within the refrigerant, the lubricant therefore moves freely through the compressor with the refrigerant, thereby providing lubrication where it is needed most between mating components.

However, due to environmental concerns, the current fluorocarbon-based refrigerants are being eliminated from use. Alternative refrigerants which alleviate environmental damage have been tested, with a 1,1,1,2-Tetrafluoroethane refrigerant, known as R134A, being a likely substitute. Unfortunately, conventional lubricants which have been previously (and successfully) employed with the fluorocarbon-based refrigerants are not soluble within the R134A refrigerant. Therefore the lubricant does not freely move throughout the compressor components when the new refrigerant is used and does not lubricate mating surfaces, as was the situation when the fluorocarbon-based refrigerants were used. The result is that during operation of the air conditioning system with the new R134A refrigerant, the bearing surfaces of the mating components are not lubricated and correspondingly they experience significantly higher incidence of wear.

Therefore, in the absence of an appropriate lubricant, it is necessary to provide a wear resistant material which is essentially self-lubricating. The desired material must be capable of not only providing sufficient lubricity, but must also be sufficiently strong to resist wear and galling during operation of the compressor. In addition, there are certain applications wherein the material must also be sufficiently ductile to permit the formation of a component from the material such as by swaging or other forming techniques. Therefore, the requirements of this material are many.

More particularly, in a five cylinder compressor which is in use within several automotive air conditioning systems, known generally as a "Wobble Plate" compressor, there is a "wobble plate" which has five pocketed regions. As shown in FIG. 1, the "wobble plate" has five sockets and is accordingly also referred to as a socket plate. As shown in FIG. 2 and 3, five high strength steel connecting rods are engaged within each of the five sockets, so as to reciprocate within each of the sockets. The socket plate material at each socket is then swaged around the ball end of the connecting rod.

Typically the socket plate has been formed from an aluminum-silicon alloy such as A356 or A357, and has performed quite satisfactorily with the previous refrigerant/lubricant combinations. However, in the absence of a suitable lubricant for use with the new refrigerant, excessive wear and even galling has occurred between the connecting rods and the aluminum-silicon sockets, whereby the softer socket material repeatedly attaches and welds itself to the harder steel connecting rod during use. This is not surprising since the conventional aluminum-silicon alloys are known for their good wear resistance, but only when lubrication is present since their hard surfaces can be quite damaging when lubrication is not present.

Therefore what is needed is an aluminum alloy for use in this socket plate which is particularly tolerant even when poorly lubricated, and which resists galling and wear by providing a certain degree of self-lubricity. In addition, the aluminum alloy must be sufficiently ductile to permit swaging of the material, yet sufficiently strong to contain the high pressure refrigerant over the repeated thermal cycling experienced within a typical automotive environment.

SUMMARY OF THE INVENTION

It is therefore an object of this invention to provide a wear-resistant aluminum-silicon-copper alloy particularly suitable for use as a wearing component, such as a socket plate, in a compressor unit of an automobile air conditioning system.

It is a further object of this invention that such an aluminum-silicon-copper alloy be sufficiently self-lubricating so as to prevent galling of the socket plate during use even when poorly lubricated.

Lastly, it is still a further object of this invention that such an aluminum-silicon-copper alloy be characterized by sufficient ductility so as to permit swaging of the socket plate formed from the alloy, yet sufficient strength to contain a pressurized refrigerant.

In accordance with a preferred embodiment of this invention, these and other objects and advantages are accomplished as follows.

According to the present invention, there is provided an improved aluminum-silicon-copper alloy having a relatively substantial addition of bismuth. The aluminum-silicon-copper alloy is particularly wear-resistant and sufficiently self-lubricating so as to be suitable for use as a wearing component, such as a socket plate which receives bearing members within a compressor unit of an automobile air conditioning system. The improved aluminum-silicon-copper alloy having the bismuth additions, minimizes wear and alleviates galling of the socket plate during use even when poorly lubricated. In addition, the improved aluminum-silicon-copper alloy of this invention is also characterized by good strength and sufficient ductility so as to permit room temperature swaging of the socket plate formed from the preferred alloy.

The preferred wear resistant aluminum-silicon-copper alloy of this invention is characterized by the following elemental composition, wherein the percentages are weight percents: from about 6.5 to twelve percent silicon with about 6.5 to 10.5 percent being most preferred; from about two to about five percent copper with about three to four percent being most preferred; and from about one to five percent bismuth with about three to four percent being most preferred. In addition, the preferred aluminum-silicon-copper alloy consists of up to about 0.15 percent iron; up to about 0.1 percent manganese; and up to about 0.1 percent zinc, with the balance of the preferred alloy being aluminum.

A particularly advantageous feature of the aluminum-silicon-copper alloy of this invention is that the relatively high level of bismuth remains essentially as elemental bismuth within the alloy, which provides a lubricating phase that results in a material having a low coefficient of friction at its surfaces. This property of self-lubricity for the preferred alloy enhances the wear resistant properties of the alloy.

It is presumed that socket plates formed from the preferred alloy would exhibit significantly diminished signs of wear during use with connecting rods which are engaged within the sockets of the socket plate. In addition, the preferred aluminum alloy of this invention is sufficiently ductile so as to be swageable at room temperature. Further, the strength of this preferred aluminum alloy is sufficient to contain a high pressure refrigerant even over extended thermal cycling which is characteristic of an automotive environment.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawing wherein.

DETAILED DESCRIPTION OF THE INVENTION

According to the present invention, there is provided an improved aluminum-silicon-copper alloy having a substantial addition of bismuth. The improved aluminum-silicon-copper alloy exhibits good wear-resistance by being sufficiently self-lubricating, and therefore is particularly suited for use as a wearing component.

Figure 1:
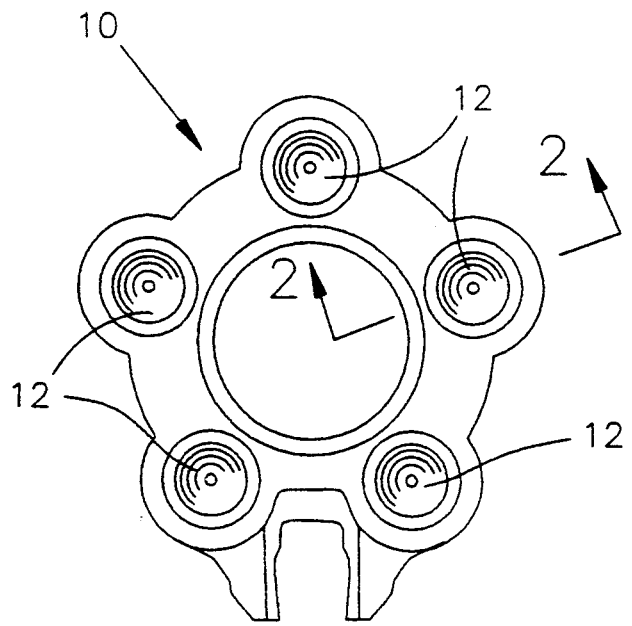
FIG. 1 shows a "wobble plate" or socket plate, formed from the preferred aluminum alloy of this invention, for use in an automotive air conditioning compressor unit wherein the socket plate has five socket regions.
Figure 2:
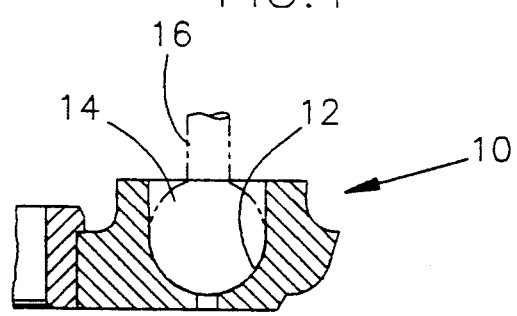
FIG. 2 shows a cross-sectional view of a socket region shown in FIG. 1.
Figure 3:
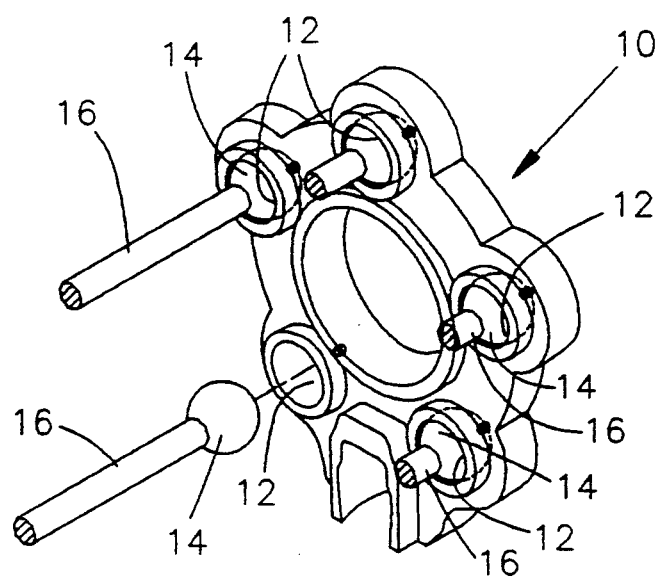
FIG. 3 shows the socket plate of FIG. 1 having five high strength steel connecting rods inserted within each of the five socket regions.

As shown in FIG. 1, the preferred alloy of this invention is used to form a "wobble plate" or socket plate 10 for use in an automotive air conditioning five cylinder compressor unit. The socket plate 10 has five pocketed regions or sockets 12. As shown in FIG. 3, the socket regions 12 of the socket plate 10 receive five high strength steel connecting rods 16. A balled end 14 of each of the five connecting rods 16 engages a corresponding socket 12 on the socket plate 10, as illustrated in FIG. 3 and cross-sectionally in FIG. 2. The dimensional tolerances between the socket 12 and the balled end 14 of the connecting rod 16 are at most only a few thousandths of an inch. The connecting rods 16 reciprocate within the socket regions 12 of the socket plate 10 and are continuously subjected to high pressures from the refrigerant during operation of the automotive air conditioning compressor unit. Therefore the balled end 14 is essentially a bearing member which bears against the socket 12. (It is to be noted that although the socket plate 10 is the intended application for the alloy of this invention, it is foreseeable that this alloy could be used in a multitude of various applications, such as those which require wear resistance.)

The improved aluminum-silicon-copper alloy of this invention minimizes wear and alleviates galling of the socket plate 10 during use even when poorly lubricated. In addition, the improved aluminum alloy is sufficiently ductile so as to permit room temperature swaging of each of the socketed regions 12 around the balled end 14 of the corresponding connecting rod 16 which is engaged within each of the socket regions 12.

In particular, the self-lubricating, wear resistant aluminum-silicon-copper alloy of this invention is characterized by the preferred elemental composition shown in Table I, wherein the percentages refer to weight percents.

TABLE I

| | |
|---|---|
| Si | 6.5%–12.0% |
| Bi | 1.0%–5.0% |
| Cu | 2.0%–5.0% |

TABLE I-continued

| Fe | 0.2% (max.) |
|---|---|
| Mn | 0.15% (max.) |
| Zn | 0.15% (max.) |
| Al | Balance |

More particularly, the silicon (Si) content of the preferred aluminum-silicon-copper alloy of this invention may vary from about 6.5 to twelve percent so as to ensure good wear resistance of the material, with the range of about 6.5 to 10.5 percent being most preferred. The silicon within the alloy reacts with the aluminum to form hard aluminum-silicon particles which increase the wear resistance of the material, as discussed more fully later.

The silicon content of the preferred aluminum-silicon-copper alloy should remain below about 12.3 percent, which is the eutectic point in the aluminum-silicon phase diagram, making the preferred alloy a hypo-eutectic aluminum-silicon-copper alloy. Maintaining the silicon level below the eutectic point ensures that hard primary silicon particles will not form within the preferred alloy. In addition, the ductility of the alloy is reduced as the silicon content is increased, accordingly it is desirable to maintain this hypo-eutectic level of silicon. Sufficient ductility is required so as to be capable of swaging the socket plate 10 for use in the compressor unit of the air conditioning system. Therefore, in the preferred alloy, the presence of the primary silicon particles is not desired and so to ensure that their formation does not occur, as well as to ensure a sufficient level of ductility, the silicon content is kept well below the eutectic point.

The preferred copper (Cu) content within the aluminum alloy of this invention may vary from about two to five weight percent with about three to four weight percent being most preferred. The presence of copper within the alloy provides the strengthening mechanism by reacting with the aluminum to form copper aluminide ($CuAl_2$). The copper appears to also enhance the age hardening affects of the alloy by precipitating many fine particles within the alloy which results in the homogeneous dispersion of the copper aluminide throughout the alloy.

The bismuth (Bi) content of the preferred aluminum-silicon-copper alloy may vary from about one percent to about five weight percent, with a range of about three to four percent being most preferred. It has been determined that the presence of bismuth within the alloy enhances the lubricity of the alloy by essentially remaining as elemental bismuth within the alloy. The elemental bismuth reduces the coefficient of friction on the bearing surfaces of the alloy. It is this high level of bismuth which enables the preferred alloy to be essentially self-lubricating, thereby alleviating excessive wear and galling of the preferred aluminum-silicon-copper base alloy during use.

An advantageous feature of this invention is that many aluminum-silicon alloys of this type, which are designed for wear resistance, also contain magnesium for strengthening purposes. However, with magnesium present, the bismuth content must then be limited, since bismuth tends to react with magnesium so as to reduce the strengthening potential of the alloy by detrimentally tying up the magnesium. Therefore, it is generally desirable to eliminate the bismuth content within these types of alloys that require strength. Yet in the preferred alloy of this invention, sufficient strength is achieved without the addition of magnesium, which then permits a relatively large amount of the lubricating bismuth to be used. Hence the alloy of this invention provides a strong yet self-lubricating material.

The preferred iron (Fe) content within the aluminum alloy of this invention may vary up to about 0.2 percent iron, with a maximum level of 0.15 or less being most preferred. The ductility of the alloy is typically impaired by the presence of iron within the alloy due to the formation of the aluminum-iron-silicon (Al-Fe-Si) compound. Therefore, it is desirable to minimize the iron content within the alloy, yet it is difficult to entirely eliminate the iron within the alloy since this level of iron is typically always present within the primary aluminum used to form the alloy.

In addition, the manganese (Mn) and zinc (Zn) contents within the preferred alloy may each vary up to about 0.15 weight percent, with a maximum of about 0.1 percent being most preferred for each element. These ranges for both the manganese and zinc again are normal levels found within the primary aluminum after smelting from bauxite prior to casting of the alloy, and are therefore going to be normally present within the final alloy.

Optionally, the alloy of this invention may include between about 0.005 and 0.015 weight percent phosphorus (P), with a concentration of about 0.010 percent being most preferred. This trace amount of phosphorus will tend to increase or induce the formation of some primary silicon so as to enhance the wear resistance of the alloy without significantly reducing the ductility or coefficient of friction of the alloy. The phosphorus would be added to the alloy by conventional phosphorus treatment methods, which include adding a phosphorus containing compound, such as a phosphorus-copper compound, to the melt during casting, since it is difficult to add phosphorus directly to the melt because of its fine powdery form. The addition of phosphorus is optional depending on the desired application for the material and considering the competing concerns of ductility versus wear resistance.

It is also to be noted that trace levels of strontium could be substituted for the phosphorus within the alloy with essentially the same results obtained. The strontium would provide a structure which is slightly higher in ductility, but a slight loss in the galling or wear resistance of the alloy would also be observed. Depending on the application, this may be desirable.

The balance of the preferred alloy is aluminum.

The most preferred composition for the alloys, as discussed above, is summarized in Table II. Again, the percentages refer to weight percents.

TABLE II

| Si | 6.5%–10.5% |
|---|---|
| Cu | 3.0%–4.0% |
| Bi | 3.0%–4.0% |
| Fe | 0.15% (max.) |
| Mn | 0.1% (max.) |
| Zn | 0.1% (max.) |
| Al | Balance |

Test bar samples, weighing about 50–60 grams each, of the preferred alloy of Table II were heat treated using a conventional T61 aluminum alloy heat treating schedule as described by the following steps, so as to maximize the tensile and yield strengths of the alloy while maintaining adequate elongation. It should be noted that the particular heat treatment schedule employed on the alloy will vary depending on the intended application for the alloy. In particular, any of the T6 aluminum heat treating schedules which basically solution heat treat, quench and then artificially age the alloy would probably be suitable for particular applications. Several different heat treatment schedules were tried on the preferred alloy in order to determine the optimum heat treatment schedule, described below, for the alloy in the socket plate 10 environment.

The preferred alloys were heat treated by first solution treating the alloy to about 990° F.±10° F. for about 12 hours to form a solid solution of copper-aluminide ($CuAl_2$), quenching in water, and then artificially aging the alloy at about 310° F.±5° F. for about fifteen hours to precipitate the copper-aluminide throughout the alloy.

Although this heat treatment schedule resulted in the preferred alloy having the desired properties for the socket plate 10 application, it is foreseeable that other heat treatment schedules could be employed having reasonable variations, such as in the temperatures, durations, or quenching medium, with satisfactory results expected.

The mechanical properties for the preferred aluminum-silicon alloys heated treated in accordance with the above procedure were determined and are as follows: an average yield strength of about 39,000 pounds per square inch (psi), and an average tensile strength of about 51,000 psi, with an average elongation value of about four percent. The strength of the alloy is sufficient to contain the high pressure refrigerant during operation of the compressor even over repeated thermal cycling, as compared to previous conventional materials which have been employed for the socket plate 10.

The average hardness, as determined by standard Brinell measurements (using a 500 kilogram load and 10 millimeter indentor for 30 seconds) was about 86.

Upon conventional metallographic examination, the microstructure of the alloy exhibited well-dispersed aluminum-silicon and bismuth phases throughout the aluminum matrix of the alloy. It is believed that the aluminum-silicon particles within the alloys of this invention are characterized by an acicular or needle-like shape. These acicular particles are characterized by a high surface area, or high aspect-ratio, which improves the wear resistance of the alloy. The presence of these hard acicular silicon particles within the alloys of this invention have been found to significantly improve their wear and galling resistant properties.

It is believed that the alloy of this invention would exhibit enhanced wear and galling resistance in an actual wearing environment, such as a socket plate 10 within an air conditioning compressor, due to the hardness and high strength of the alloy when coupled with its lubricity. The self-lubricating qualities of the alloy are provided by the bismuth additions. In addition, it is believed that the alloy of this invention is sufficiently ductile and would permit successful room temperature forming operations, such as swaging, as compared to the formability of previous conventional materials used in the socket plate 10.

In summary, there are many advantageous features associated with the aluminum-silicon-copper alloy of this invention. The relatively high level of bismuth within the alloy cooperates with the other elemental additions by providing a sufficiently self-lubricating, low friction surface which, in turn, enhances the wear and galling resistant properties of the alloy, as well as its machinability. Socket plates which would be formed from the preferred alloy should exhibit significantly enhanced wear and galling resistance during use when connecting rods are engaged within the sockets of the socket plate.

Therefore, while our invention has been described in terms of a preferred embodiment, it is apparent that other forms could be adopted by one skilled in the art, such as by modifying the aluminum alloy within the preferred ranges of element concentrations, or by modifying the processing steps, or by employing the alloy in an alternative environment. Accordingly, the scope of our invention is to be limited only by the following claims.

The embodiments of the invention in which an exclusive property or privilege is claimed are defined as follows:

1. A room temperature formable, wear resistant aluminum alloy particularly suitable for use as a wear surface component in an automotive air conditioning compressor unit, said wear resistant aluminum alloy having sufficient self lubricity so as to prevent wear and galling even when poorly lubricated, said wear resistant aluminum alloy consisting of the following by weight:
   from about 6.5 to twelve percent silicon;
   from about two to five percent copper;
   from about one to five percent bismuth;
   at most about 0.2 percent iron;
   at most about 0.15 percent manganese;
   at most about 0.15 percent zinc; and
   the balance being substantially all aluminum with incidental impurities;
such that said bismuth essentially remains in its elemental form within said wear resistant alloy so as to minimize the coefficient of friction of said wear resistant alloy, thereby enhancing the self-lubricity and wear resistant properties of said alloy, while all of said constituents sufficiently cooperate within said alloy to provide adequate ductility so as to permit the room temperature forming operations of said alloy.

2. A wear resistant aluminum alloy as recited in claim 1 wherein said silicon ranges from about 6.5 to 10.5 percent.

3. A wear resistant aluminum alloy as recited in claim 1 wherein said bismuth ranges from about three to four percent.

4. A wear resistant aluminum alloy as recited in claim 1 wherein said copper ranges from about three to about four percent.

5. A wear resistant aluminum alloy as recited in claim 1 wherein said alloy further contains from about 0.005 to about 0.015 percent phosphorus.

6. A wear resistant aluminum alloy as recited in claim 1 wherein said silicon sufficiently cooperates with said aluminum so as to form an aluminum-silicon phase which is primarily acicular in shape.

7. A wear resistant aluminum alloy particularly suitable for use in an automotive air conditioning unit having a socket plate formed from the wear resistant alloy, wherein the socket plate has a plurality of sockets which receive a corresponding plurality of bearing members, said wear resistant aluminum alloy having sufficient lubricity so as to prevent wear and galling between the sockets and bearing members even when poorly lubricated, while also having sufficient ductility so as to permit swaging of each socket around the corresponding bearing member, said wear resistant aluminum alloy consisting of the following by weight:
from about 6.5 to 10.5 percent silicon;
from about three to four percent copper;
from about three to four percent bismuth;
at most about 0.15 percent iron;
at most about 0.1 percent manganese;
at most about 0.1 percent zinc;
the balance being substantially all aluminum with incidental impurities;
such that said silicon and aluminum cooperate to form a primarily acicular shaped aluminum-silicon phase, and said bismuth essentially remains in its elemental form within said wear resistant alloy so as to minimize the coefficient of friction of said wear resistant alloy, thereby enhancing the self-lubricity and wear resistant properties of said alloy, while all of said constituents sufficiently cooperate within said alloy to provide adequate ductility so as to permit the room temperature swaging and/or other forming operations of said alloy.

8. A wear resistant aluminum alloy as recited in claim 7 wherein said alloy further contains from about 0.005 to about 0.015 percent phosphorus.

* * * * *